United States Patent
Tanaka

(10) Patent No.: US 9,018,503 B2
(45) Date of Patent: Apr. 28, 2015

(54) PRACTICE TIME CALCULATING APPARATUS, A PRACTICE TIME CALCULATING METHOD, AND A COMPUTER READABLE RECORDING MEDIUM

(71) Applicant: Casio Computer Co., Ltd., Shibuya-ku, Tokyo (JP)

(72) Inventor: Takahiro Tanaka, Machida (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 14/031,817

(22) Filed: Sep. 19, 2013

(65) Prior Publication Data

US 2014/0076123 A1 Mar. 20, 2014

(30) Foreign Application Priority Data

Sep. 20, 2012 (JP) ................................. 2012-206501

(51) Int. Cl.
*G09B 15/06* (2006.01)
*G09B 5/00* (2006.01)
*G04F 10/00* (2006.01)
*G09B 15/00* (2006.01)

(52) U.S. Cl.
CPC ... *G09B 5/00* (2013.01); *G04F 10/00* (2013.01); *G09B 15/00* (2013.01)

(58) Field of Classification Search
CPC ........ G09B 15/06; G09B 15/00; G10F 10/00; G10B 5/00
See application file for complete search history.

(56) References Cited

U.S. PATENT DOCUMENTS

| 5,195,061 | A  * | 3/1993  | Curtis et al. ..................... 368/9 |
| 5,746,605 | A  * | 5/1998  | Kennedy .................. 434/307 R |
| 6,287,124 | B1 * | 9/2001  | Yamaura et al. ............. 434/219 |
| 6,426,455 | B2 * | 7/2002  | Hasegawa .................. 84/470 R |
| 6,660,922 | B1 * | 12/2003 | Roeder ....................... 84/477 R |
| 6,751,439 | B2 * | 6/2004  | Tice et al. ..................... 434/350 |
| 7,129,407 | B2 * | 10/2006 | Hiratsuka et al. ............... 84/609 |

(Continued)

FOREIGN PATENT DOCUMENTS

| JP | 2004-184757 A | 7/2004 |
| JP | 2007264400 A | 10/2007 |

OTHER PUBLICATIONS

Japanese Office Action dated Aug. 12, 2014, issued in counterpart Japanese Application No. 2012-206501.

*Primary Examiner* — Robert W Horn
(74) *Attorney, Agent, or Firm* — Holtz, Holtz, Goodman & Chick PC

(57) ABSTRACT

An apparatus is provided, for calculating a practice time. The apparatus is used by a user to calculate such practice time that he/she requires to improve his/her playing technique to reach a predetermined progressing level at the playing technique. In the apparatus, a progressing-level evaluating unit evaluates a progressing level of a playing technique of the user who operates a playable unit. A history of the evaluated progressing level is recorded in a progressing-level recording unit. An operation-number counting unit counts the number of operations executed on the playable unit by the user every unit time. A history of the counted number of operations is recorded in an operation-number recording unit. A practice-time calculating unit calculates the practice time based on the history of the progressing level recorded in the progressing-level recording unit and the history of the number of operations recorded in the operation-number recording unit.

14 Claims, 12 Drawing Sheets

(56) References Cited

U.S. PATENT DOCUMENTS

| | | | |
|---|---|---|---|
| 7,453,036 B1* | 11/2008 | Henkel | 84/483.2 |
| 7,525,035 B2* | 4/2009 | Katsuta | 84/609 |
| 7,538,266 B2* | 5/2009 | Takehisa | 84/609 |
| 7,663,044 B2* | 2/2010 | Katsuta | 84/470 R |
| 7,848,699 B2* | 12/2010 | Ohshima et al. | 434/307 R |
| 8,338,684 B2* | 12/2012 | Pillhofer et al. | 84/470 R |
| 8,513,511 B2* | 8/2013 | Ikeya et al. | 84/478 |
| 8,697,972 B2* | 4/2014 | Dripps et al. | 84/470 R |
| 8,735,707 B2* | 5/2014 | Paterson et al. | 84/470 R |
| 8,766,077 B2* | 7/2014 | Soejima | 84/477 R |
| 8,809,662 B2* | 8/2014 | Tanaka | 84/470 R |
| 2001/0039870 A1* | 11/2001 | Shimaya et al. | 84/478 |
| 2010/0175537 A1* | 7/2010 | Ikeya et al. | 84/478 |
| 2013/0081531 A1* | 4/2013 | Minamitaka | 84/477 R |
| 2014/0076123 A1* | 3/2014 | Tanaka | 84/465 |
| 2014/0100010 A1* | 4/2014 | Lee et al. | 463/7 |

\* cited by examiner

FIG. 2A

| PERFORMANCE DATA 1 | USER'S ID |
| --- | --- |
| PERFORMANCE DATA 2 | PRACTICE PIECE ID |
| PERFORMANCE DATA 3 | NUMBER OF PERFORMANCE STARTING MEASURE |
| ... | NUMBER OF PERFORMANCE FINISHING MEASURE |
| PERFORMANCE DATA n | PERFORMANCE PART |
|  | ACHIEVEMENT LEVEL |
|  | RECORDING TIME |

FIG. 2B

| NOTE NUMBER DATA 1 | USER'S ID |
| --- | --- |
| NOTE NUMBER DATA 2 | PRACTICE PIECE ID |
| NOTE NUMBER DATA 3 | NUMBER OF NOTES IN UNIT TIME |
| ... | PRACTICE STATE |
| NOTE NUMBER DATA n | RECORDING TIME |

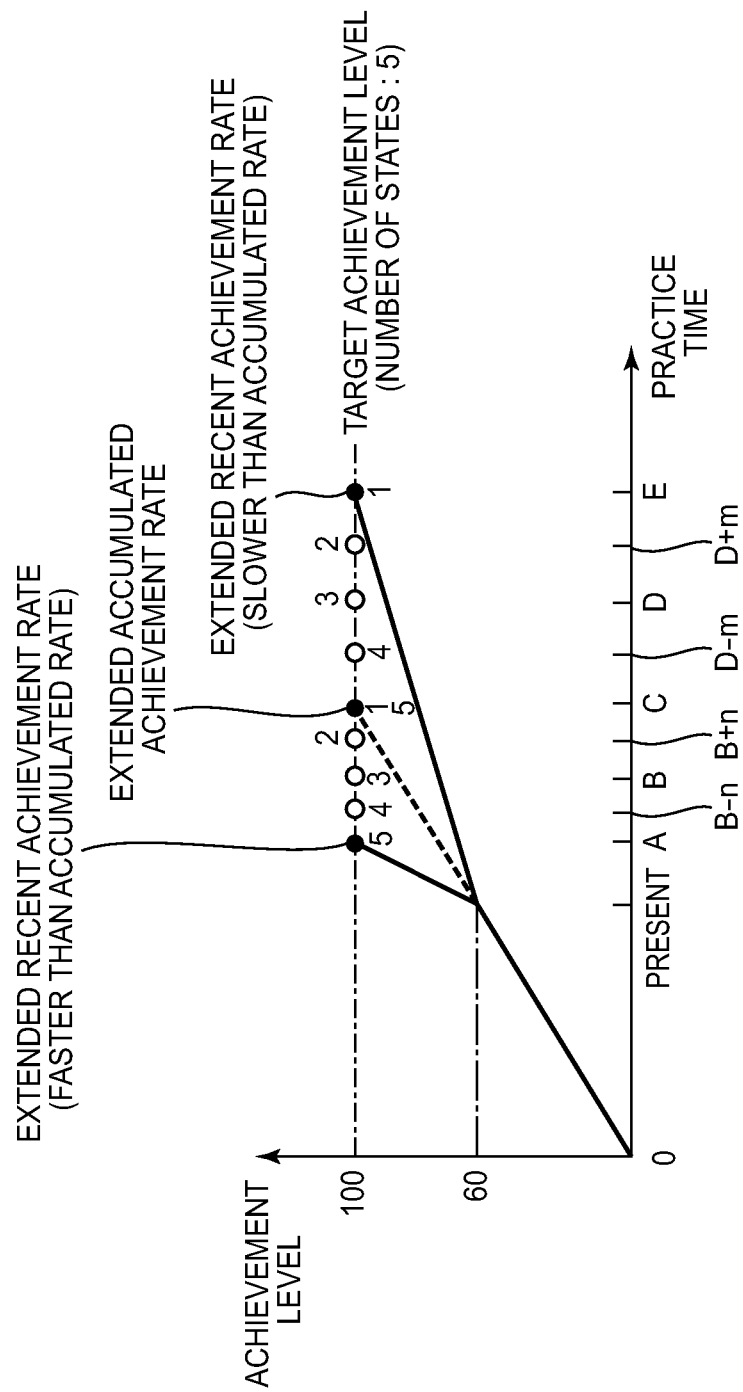

PRACTICE TIME CALCULATING APPARATUS, A PRACTICE TIME CALCULATING METHOD, AND A COMPUTER READABLE RECORDING MEDIUM

CROSS-REFERENCE TO RELATED APPLICATION

The present application is based upon and claims the benefit of priority from the prior Japanese Patent Application No. 2012-206501, filed Sep. 20, 2012, the entire contents of which are incorporated herein by reference.

BACKGROUND OF THE INVENTION

1. Field of the Invention

The present invention relates to a practice time calculating apparatus, a practice time calculating method, and a computer readable recording medium, which can calculate a practice time more precisely that a user requires to improve his/her playing technique to reach a target level at playing technique.

2. Description of the Related Art

A conventional technique is disclosed in Japanese Unexamined Patent Publication No. 2004-184757, Paragraphs [0097] to [0110], FIG. 17 and FIG. 18, in which technique, when a user plays a previously prepared practice piece on a keyboard instrument or one of electronic musical instruments, such as electronic pianos and/or electronic keyboard instruments, a current progressing level of the user's playing technique is judged on every practice piece based on data (performance data) representing contents of performance performed every time the user has tried his/her practice, and such progressing level is displayed to the user.

Further, Japanese Unexamined Patent Publication No. 2004-184757 discloses a technique, which calculates a practice time based on the temporal variation in the progressing level judged with respect to the user's past practices, that is, calculates a practice time (remaining practice time) that the user requires to improve his/her playing technique to reach a target level at playing technique.

But when the remaining practice time is calculated based on the temporal variation in progressing level judged on the past practices, the following disadvantages are invited. That is, the progressing rate of the playing technique is not always constant. For example, the progressing rate suddenly increases from a time. In this case, the recent progressing level is not affected on the calculation of the remaining practice time, and as a result, the calculated remaining practice time will be longer than the practice time that will be required actually.

Off course, the above disadvantage will be avoided, if the remaining practice time is calculated based on the progressing level in the recent time. But in such case, another disadvantage will be encountered. For instance, even if the user's progressing level of the playing technique is substantially the same as ever, the user's progressing level will increase, when the user plays a portion of a practice piece of a relatively lower degree of difficulty in the recent time. On the contrary, the user's progressing level will decrease, when the user plays a portion of a relatively higher degree of difficulty. Therefore, there will be another problem that a large variation is caused in the calculated practice time due to the degree of difficulty of the practice piece that the user plays.

The present invention has been made to solve these problems involved in the conventional technique, and provides a practice time calculating apparatus, a practice time calculating method, and a computer readable recording medium, which can calculate a practice time more precisely that the user requires to improve his/her playing technique to reach the target level at playing technique.

SUMMARY OF THE INVENTION

According to one aspect of the invention, there is provided a practice-time calculating apparatus, which comprises a progressing-level evaluating unit which evaluates a progressing level of a playing technique of a user who operates a playable unit, a progressing-level history recording unit which records a history of the progressing level evaluated by the progressing-level evaluating unit, an operation-number counting unit which counts the number of operations executed on the playable unit by the user in a unit time, an operation-number history recording unit which records a history of the number of operations counted by the operation-number counting unit, and a practice-time calculating unit which calculates a practice time, which is required to the user to improve the playing technique to reach a predetermined progressing level at the playing technique, based on the history of the progressing level recorded in the progressing-level history recording unit and the history of the number of operations recorded in the operation-number history recording unit.

BRIEF DESCRIPTION OF THE DRAWINGS

FIG. 2A is a view schematically showing performance history data.

FIG. 2B is a view schematically showing note-number history data.

FIG. 12 is a view corresponding to FIG. 11, in the case where the number of expected progress variables is set to 5.

DETAILED DESCRIPTION OF THE PREFERRED EMBODIMENTS

Figure 1:
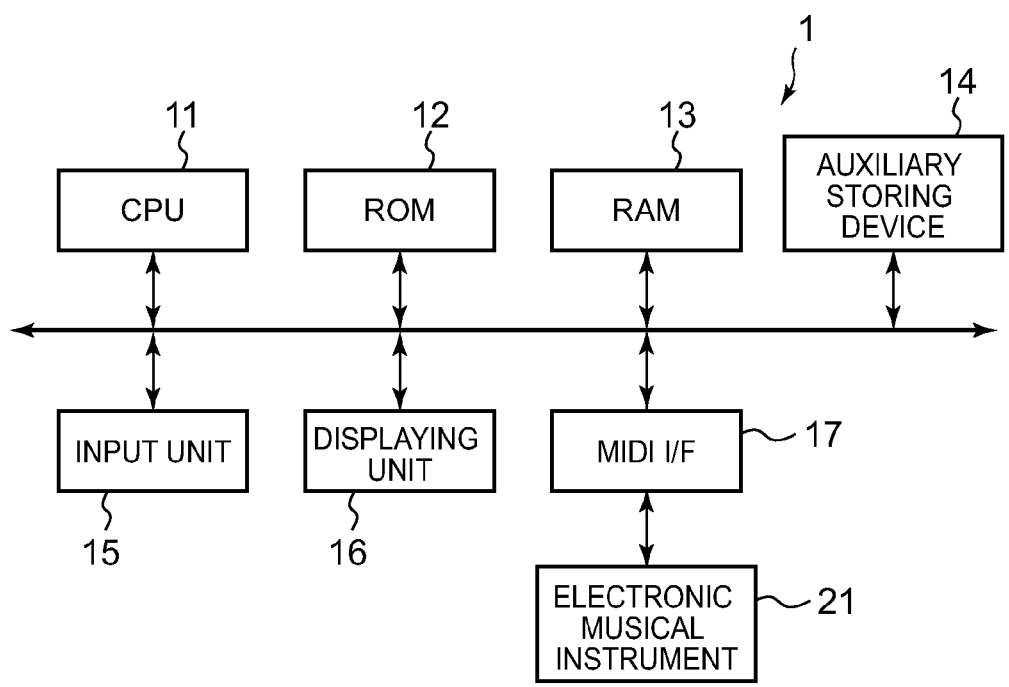
FIG. 1 is a block diagram showing a schematic configuration of a musical-instrument practicing apparatus according to the present invention.

The embodiments of the invention will be described with reference to the accompanying drawings in detail. FIG. 1 is a block diagram showing a schematic configuration of a musical-instrument practicing apparatus 1, which is provided with a function of a practice-time calculating apparatus according to the present invention.

As shown in FIG. 1, the musical-instrument practicing apparatus 1 comprises CPU 11, ROM (Read Only Memory) 12, RAM (Random Access Memory) 13, an auxiliary storing device 14, an input unit 15, a displaying unit 16, and MIDI (Musical Instrument Digital Interface, Registered Trademark) interface (I/F) 17, all of which are connected to each other through a bus. CPU 11 mainly serves to control the whole operation of the musical-instrument practicing apparatus 1. CPU 11 is provided with a built-in timer having a calendar function for counting the current date and time.

The input unit 15 comprises, for example, buttons and the like. The input unit 15 serves to receive various sorts of information in response to a user's instructing operation executed on said input unit 15 and to supply the received instructing information to CPU 11.

The displaying unit 16 consists of a displaying device such as LCD (Liquid Crystal Display), and displays various sorts of information under control of CPU 11.

MIDI interface 17 is connected with an electronic musical instrument 21. In the embodiment of the invention, keyboard instruments such as electronic pianos and electronic keyboard instruments having a keyboard as an operating device are used as the electronic musical instrument 21.

The electronic musical instrument 21 comprises a sound system, plural LED (Light Emitting Diodes) provided on respective keys of the keyboard, a controlling circuit for controlling the whole operation of the electronic musical instrument 21, and MIDI interface. Further, the sound system comprises a sound source unit for generating waveform data of a sound in response to operation performed by the user on the keyboard, D/A converter, an amplifier, and a speaker.

The musical-instrument practicing apparatus 1 supplies the electronic musical instrument 21 with practice-piece data, that is, sequence data in MIDI format through MIDI interface 17. The electronic musical instrument 21 has a support function, which makes LED successively turn on to indicate keys to be played with the progress of a practice piece, when the user plays the practice piece.

When the user has used the support function to play a practice piece, performance data (sequence data) including information indicating played or pressed keys is sequentially input to the musical-instrument practicing apparatus 1.

The musical-instrument practicing apparatus 1 is connected with the electronic musical instrument 21 through MIDI interface 17, but an interface other than MIDI interface, such as USB (Universal Serial Bus) can be used to connect the musical-instrument practicing apparatus 1 with the electronic musical instrument 21.

The auxiliary storing device 14 of the musical-instrument practicing apparatus 1 is a storage device such as a high-capacity magnetic hard disk drive. The auxiliary storing device 14 stores plural pieces of practice-piece data to be supplied to the electronic musical instrument 21, various sorts of programs for CPU 11 to control the operation of the musical-instrument practicing apparatus 1, and various sorts of setting data.

further, performance history data 101 shown in FIG. 2A is stored in the auxiliary storing device 14. The performance history data 101 comprises "n" pieces (1 to n) of performance data. Each piece of performance data is produced every time the user has played a practice piece once. The performance data (1 to n) represents the user's performance (practice) contents, and is produced based on performance-content data supplied from the electronic musical instrument 21 to the musical-instrument practicing apparatus 1 every time the user has played the practice piece once.

In the above description, the case where the user has played the practice piece once means that the user has continuously performed a series of key-playing operations. If a series of key-playing operations are performed and a predetermined time lapses before the following series of key-playing operations will be performed, then it is determined that the former series of key-playing operations is the first performance (practice) and the following series of key-playing operations is the second performance (practice). In the following description, it is supposed that the above predetermined time shall be 3 seconds.

As shown in FIG. 2A, the performance data (1 to n) each comprises the following items: a user's ID; a practice piece ID; the number of the performance starting measure; the number of the performance finishing measure; a performance part; an achievement level; and a recording time.

The user's ID is a character string for identifying the user who plays the electronic musical instrument 21. The practice piece ID is a character string for identifying a practice piece. The number of the performance starting measure indicates the number of the measure of the practice piece designated by the practice piece ID, from which the user starts performance. The number of performance finishing measure indicates the number of the measure of the practice piece designated by the practice piece ID, at which the user finishes performance.

The performance part is a value indicating how to play a part of the practice piece, consisting of one or plural measures. Such part of the practice piece is designated every performance by the number of the performance starting measure and the number of performance finishing measure. More specifically, "how to play" or a playing form is divided into three categories: a "single-hand part" including a right hand part and/or a left hand part, a "both-hands part", and a "mixed part" including the single-hand part and the both-hands part. Three values 1, 2, and 3 are used to discriminate the three categories of the playing forms.

The achievement level is represented by a value larger than "0". When the user practices playing a practice piece once, the achievement level represents how much the user has progressed his/her technique of playing the practice piece, and is measured in numerical terms. The recording time represents a time when each piece of performance data is recorded as the performance history data 101.

Further, note-number history data 201 shown in FIG. 2B is stored in the auxiliary storing device 14. The note-number history data 201 comprises "n" pieces (1 to n) of note-number data. Each piece of note-number data (1 to n) represents contents of the user's key-playing operations, and is produced every predetermined unit time, based on performance-content data supplied from the electronic musical instrument 21 to the musical-instrument practicing apparatus 1, in parallel with storing the above performance data. In the following description, it is supposed that the above predetermined unit time shall be 2 minutes.

As shown in FIG. 2B, the note-number data (1 to n) each comprises the following items: a user's ID; a practice piece ID; the number of notes in the unit time; a practice state; and a recording time.

The user's ID is a character string for identifying the user who plays the electronic musical instrument 21. The practice piece ID is a character string for identifying a practice piece. The number of notes in the unit time corresponds to the number of keys (notes), which the user plays or presses in the predetermined unit time while he/she is playing the practice piece.

The practice state is a value representing the user's playing form that the user takes in the predetermined unit time. The practice state is discriminated depending on, to which of the following three categories of playing forms the user's key-playing operation within the predetermined unit time corresponds, the single-hand part, the both-hands part or the mixed part, or whether the user's key-playing operation covers the whole range (more than predetermined number of measures) or a partial range of the practice piece. The specific practice state is divided into six categories: a single-hand partial practice; a both-hands partial practice; a single-hand/both-hands mixed partial practice; a single-hand whole practice; a both-hands whole practice; and a single-hand/both-hands mixed whole practice. Six values 1 to 6 are used to indicate the six categories of the practice state, respectively.

The recording time represents a time when each piece of note-number data is recorded as the note-number history data 201.

In the musical-instrument practicing apparatus 1 having the above configuration, the performance history data 101 and the note-number history data 201 are successively updated while the user is playing a practice piece on the electronic musical instrument 21 with the aid of the support function. In other words, the musical-instrument practicing apparatus 1 obtains new performance history data 101 and note-number history data 201 from the electronic musical instrument 21, and stores the obtained data 101 and 201, sequentially.

While the user is playing the practice piece, the musical-instrument practicing apparatus 1 successively calculates a practice time based on the performance history data 101 and the note-number history data 201 and displays the calculated practice time on the displaying unit 16, wherein the practice time is a time period (remaining practice time) that the user needs before he/she improves his/her playing technique to reach his/her target progressing level (achievement level) at playing technique. The target progressing level of playing technique is a progressing level, at which the user feels that he/she can play the practice piece naturally and fluently, and such target progressing level is previously decided with respect to every practice piece.

Before describing the specific operation of the musical-instrument practicing apparatus 1, a calculation of the remaining practice time will be described schematically.

Figure 11:
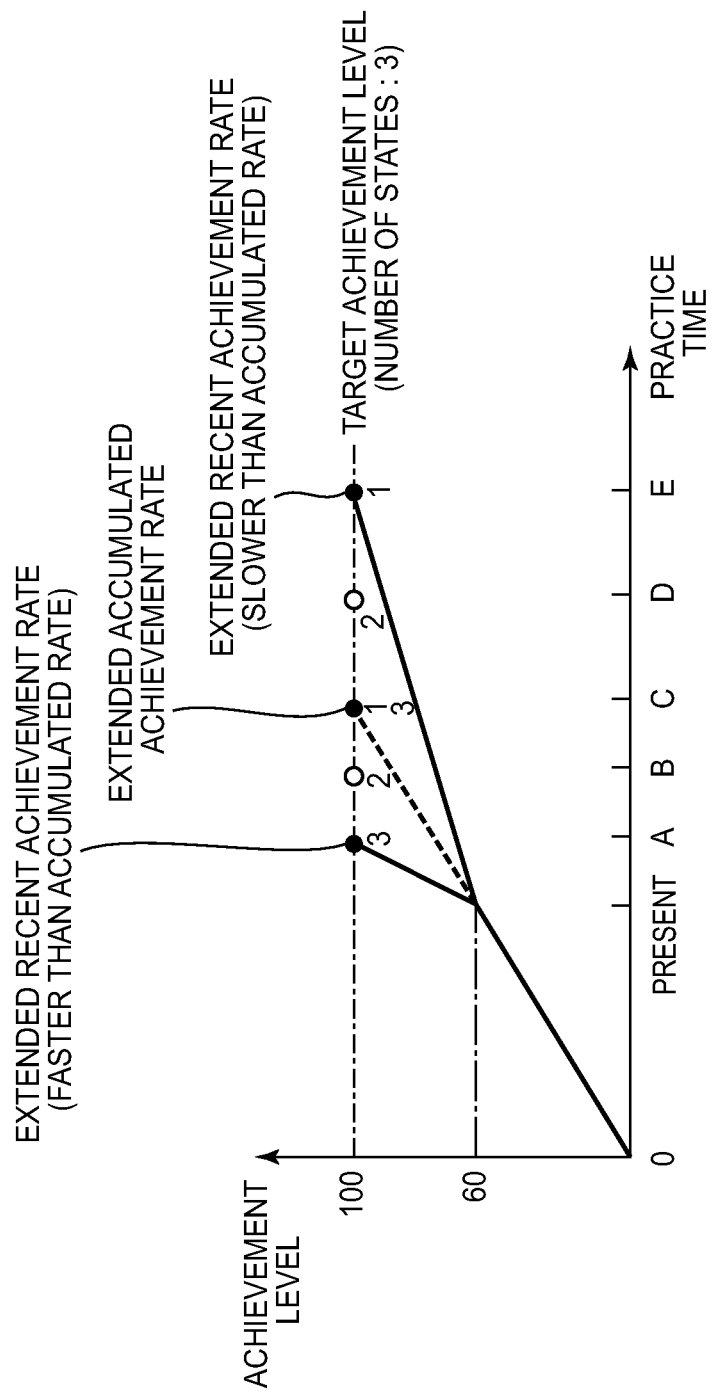
FIG. 11 is a view showing, for convenience, a relationship between achievement levels of playing technique and practice times.

In general, when the user repeatedly plays a practice piece, the more he/she practices playing the practice piece, the more he/she will make progress in the playing technique. FIG. 11 is a view showing, for convenience, a relationship between the progressing levels of the playing technique and the practice times, that is, a relationship between the achievement levels and the practice times, written in the performance history data. In FIG. 11, the achievement level corresponding to the target level of the playing technique is set to "100", the initial achievement level is set to "0" at the time when the user starts the practice, and the achievement level of the present playing technique of the user is "60".

If it is assumed that the playing technique is improved in proportion to a time duration for practice (practice time), a variation in the achievement level of the playing technique will be expressed by a straight line connecting the achievement levels "0" and "60", and the slope of the straight line will be a variation rate of the achievement level (hereinafter, referred to as the "accumulated achievement rate"). A portion indicated by a broken line is an expected variation of the achievement level. Therefore, if it is assumed that the playing technique is improved in proportion to the practice time at all times, it can be estimated that a time when the achievement level of the playing technique reaches the target level will be a time indicated by a black point corresponding to the practice time "C" shown in FIG. 11.

Meanwhile, since the progressing rate of the playing technique is not always constant but varies as described above, when a time, at which the achievement level of the playing technique will reach the target level is calculated based on the recent variation rate of the achievement level (hereinafter, referred to as the "recent achievement rate"), such time will come earlier or later than the time calculated based on the accumulated achievement rate.

If the recent achievement rate is faster than the accumulated achievement rate, the time calculated based on the recent achievement rate will reach earlier than the time calculated based on the accumulated achievement rate, and is shown by a black point (3) corresponding to the practice time "A" as shown in FIG. 11. On the contrary, if the recent achievement rate is slower than the accumulated achievement rate, the time calculated based on the recent achievement rate will reach later than the time calculated based on the accumulated achievement rate, and is shown by a black point (1) corresponding to the practice time "E" as shown in FIG. 11.

Then, a time, at which the achievement level of the playing technique actually reaches the target level will fall within the range between the earlier time (the practice time "A") and the later time (the practice time "E"), both calculated based on the recent achievement rate. In other words, the actual practice time that the user needs to improve the achievement level of his/her playing technique to reach the target level at playing technique will fall into the range from the earlier time calculated based on the recent achievement rate to the time calculated based the accumulated achievement rate, or the range from the time calculated based the accumulated achievement rate to the later time calculated based on the recent achievement rate.

It will be decided depending on an expected progress in the playing technique, that is, depending on how much the expected progressing rate of the playing technique will be relatively faster or slower than the previous progressing rate of the playing technique, to which time period, the practice time that the user needs to improve the achievement level of his/her playing technique to reach the target level at playing technique is closer, the time period calculated based on the accumulated achievement rate or the time period calculated based on the recent achievement rate (practice time in case of the earlier time or practice time in case of the later time).

In the musical-instrument practicing apparatus 1, on the ground of the above expected progress of the playing technique, the expected achievement rates (adjustment achievement level to be described later) of the playing technique are calculated based on the accumulated achievement rate and the recent achievement rate, and the final remaining practice times that the user requires to improve his/her playing technique are calculated based on the calculated achievement rates.

The expected progress of the playing technique can be determined based on comparison of the number of notes played by the user in the most recent unit time, that is, the number of keys pressed by the user in the most recent unit time, with the number of notes played by the user in the unit time of the earlier practice. In other words, if the number of notes played by the user in the most recent unit time is larger than the number of notes played by the user in the unit time of the earlier practice, it can be decided that the progressing rate of the playing technique tends to increase. On the contrary, if the number of notes played by the user in the most recent unit time is smaller than the number of notes played by the user in the unit time of the earlier practice, it can be decided that the progressing rate of the playing technique tends to decrease.

Accordingly, when the remaining practice time is calculated in the musical-instrument practicing apparatus 1, an index number indicating the expected progress of the playing technique is obtained based on the note-number history data 201 shown in FIG. 2B, that is, a history of the number of notes in every unit time. More specifically, as representing the index number indicating the expected progress of the playing technique, two variables such as a motivation state variable and a playing-technique state variable are obtained. In the musical-instrument practicing apparatus 1, the two variables are selectively used to obtain the expected achievement rate of the playing technique. The user is allowed to previously decide which variable is to be used, the motivation state variable or the playing-technique state variable.

Figure 3:
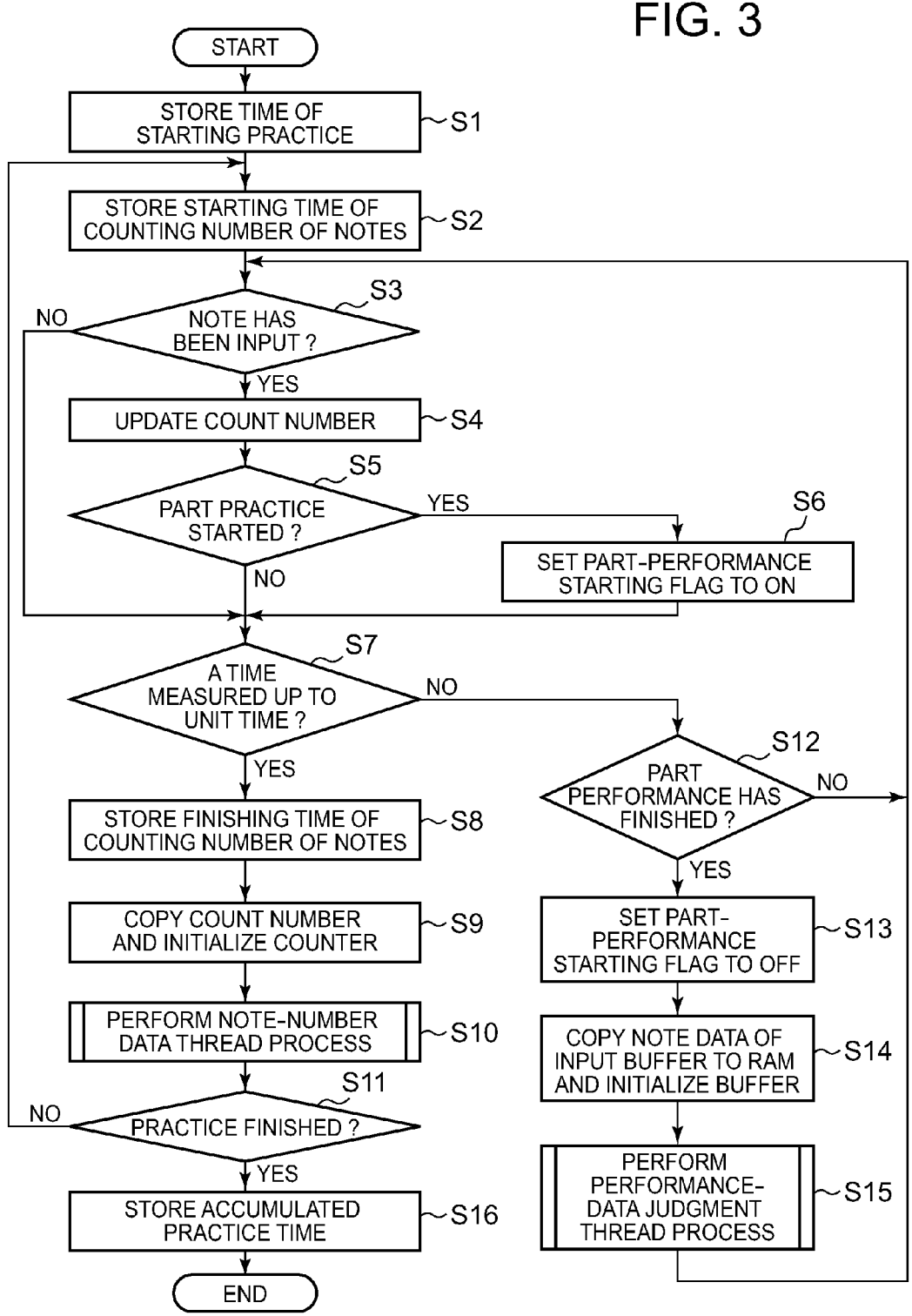
FIG. 3 is a flow chart showing a process performed in the musical-instrument practicing apparatus, while the user is playing a practice piece on an electronic musical instrument.

Hereinafter, the operation of the musical-instrument practicing apparatus 1 will be described in detail, which operation is performed when the user uses the support function while playing a practice piece on the electronic musical instrument 21. FIG. 3 is a flow chart showing a process performed by CPU 11 in accordance with the program stored in the auxiliary storing device 14, when the user uses the support function while playing a practice piece on the electronic musical instrument 21.

CPU 11 starts the process when the user has operated a button of the input unit 15 to select a practice piece and to give an instruction of starting the practice to the electronic musical instrument 21. CPU 11 stores in RAM 13 the present time as a time of starting the practice (step S1 in FIG. 3). In the process at step S1, CPU 11 reserves in RAM 13 plural memory areas to be used as a register, a buffer, and a counter, respectively. Thereafter, CPU 11 repeatedly performs the following processes.

CPU 11 stores the present time as a starting time of counting the number of notes in the register (step S2). Every time a note has been input or a key has been pressed, and more specifically, every time new note data is input from the electronic musical instrument 21 (YES at step S3), CPU 11 stores the note data in a note-input buffer and increments a count number (the number of times of the key operation) of the counter (step S4). In the note-input buffer are stored the note number of the note data in the sequence data of the practice piece contained in the input note data and an input time of said input note data.

CPU 11 judges whether apart practice has started, that is, judges whether a performance has started (step S5). More specifically, CPU 11 determines at the time when the note number of the note data stored in the note-input buffer has been specified, that the part practice has started.

When it is not determined that the part practice has started (NO at step S5), CPU 11 advances directly to step S7. When it is determined that the part practice has started (YES at step S5), CPU 11 sets a part-performance starting flag to ON (step S6) and then advances to step S7. In the process at step S6, CPU 11 stores in the note-input buffer the present time as a time of starting the performance.

CPU 11 judges whether a time lapsed (lapsed time) from the starting time of counting the number of notes stored in the register at step S2 has measured up to a predetermined unit time (2 minutes in the present embodiment) (step S7), wherein the predetermined unit time is an interval, at which the state variables such as the motivation state variable and playing-technique state variable are calculated.

When it is determined that the lapsed time has not measured up to the unit time (NO at step S7), CPU 11 judges whether the part performance has finished (step S12). More specifically, if a time of 3 seconds has lapsed after the input time of the latest note data stored in the note-input buffer, then CPU 11 determines that the part performance has finished (YES at step S12). On the contrary, if the time of 3 seconds has not lapsed after the input time of the latest note data stored in the note-input buffer at present, then CPU 11 determines that the part performance has not yet finished (NO at step S12).

When it is determined that the part performance has not finished (NO at step S12), CPU 11 returns to step S3, and performs the processes at step S3 to step S7, again. More specifically, when a new note has not been input (NO at step S3), CPU 11 advances directly to step S7. When a new note has been input (YES at step S3), CPU 11 stores note data in the note-input buffer and updates the count number of notes (step S4).

Although not shown in FIG. 3, when the part-performance starting flag has been set to ON, CPU 11 skips the process at step S5 after the process of step S4.

CPU 11 repeatedly performs the above processes to sequentially store new note data in the note-input buffer, and finishes counting the number of notes at the time when the time lapsed after the time of starting counting the number of notes has measured up to the unit time (2 minutes) (YES at step S7). Then, CPU 11 stores in the register the present time as a finishing time of counting the number of notes (step S8). Further, CPU 11 copies the count number of the note number counter to the predetermined working area of RAM 13 and initializes the counter (step S9).

Thereafter, CPU 11 performs a note-number data thread process to be described later (step S10). In the note-number data thread process, CPU 11 stores new note-number data as the note-number history data 201 in the auxiliary storing device 14. As will be described later, the remaining practice time is displayed (updated) in the note-number data thread process.

After performing the note-number data thread process, CPU 11 judges whether the user has finished the practice (step S11). In other words, for example, when it can be confirmed that the user has operated a predetermined button to give an instruction of finishing the practice, and when a new note has not been input during a predetermined time period (for example, for 3 minutes) after the time of starting the practice, then CPU 11 determines that the practice has finished.

When it is determined that the practice has not finished (NO at step S11), CPU 11 returns to step S2, and stores in the register the present time as a new time of starting counting the number of notes. Then, CPU 11 repeatedly performs the above processes, whereby new note-number data is successively stored as the note-number history data 201 in the auxiliary storing device 14.

Meanwhile, while new note-data is successively stored in the note-input buffer in parallel with the above mentioned processes, when it is determined that the part performance has finished, that is, when a time of 3 seconds has lapsed after the input time of the latest note data stored in the note-input buffer (YES at step S12), CPU 11 immediately sets the part-performance starting flag to OFF (step S13).

Then, CPU 11 copies a series of note data stored in the note-input buffer to the predetermined working area of RAM 13 and initializes the note-input buffer (step S14). CPU 11 performs a performance-data judgment thread process on the series of note data in the predetermined working area of RAM 13, that is, on the note data concerning to the present performance, thereby storing in the auxiliary storing device 14 new performance data composing the performance history data 101 shown in FIG. 2A (step S15).

When it is determined that the practice has finished (YES at step S11) while the above processes are being repeatedly performed, then CPU 11 stores an accumulated practice time (step S16). More specifically, CPU 11 calculates a practice time from the time of starting the practice (practice starting time) stored in RAM 13 at step S1 to the present time, thereby obtaining a practice time at this time, and adds the obtained practice time at this time to the accumulated practice time for each practice piece previously stored in the auxiliary storing device 14, thereby updating the accumulated practice time. Then, CPU 11 finishes the whole processes.

In the process described above, CPU 11 performs various processes in timeshare such as an interrupting process, thereby performing the note-number data thread process (step S10) and the performance-data judgment thread process (step S15) in parallel with other process.

Figure 4:
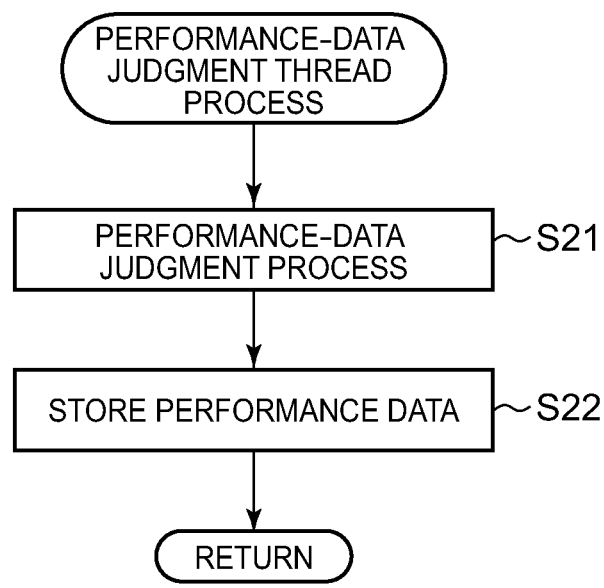
FIG. 4 is a flow chart of a performance-data judgment thread process performed in the musical-instrument practicing apparatus.

The performance-data judgment thread process performed at step S15 will be described in detail. As described above, the performance-data judgment thread process is performed to store in the auxiliary storing device 14 new performance data as the performance history data 101. FIG. 4 is a flow chart of the performance-data judgment thread process performed by CPU 11.

In the performance-data judgment thread process shown in FIG. 4, CPU 11 performs a performance-data judgment process based on the note data of the present performance to obtain various sorts of data, which compose new performance data as shown in FIG. 2A, including the achievement level and so on (step S21).

More particularly, in the performance-data judgment process, CPU 11 compares the note data of the present performance with the note data of the whole practice piece, thereby confirming to which portion of the whole practice piece the present performance corresponds, and obtains the number of the present performance starting measure and the number of the present performance finishing measure, both of which define the portion of the whole practice piece played at the present performance.

Further, CPU 11 judges which of the playing forms: the single-hand part, the both-hands part or the mixed part, is applied to the performance part defined between the performance starting measure and the performance finishing measure, and obtains the value (any one of 1 to 3) indicating the playing form applied to such performance part.

Further, CPU 11 compares the note data of the present performance with the note data of the whole practice piece to obtain an achievement level of the present performance. When obtaining the achievement level, CPU 11 uses the number of notes and the number of rests contained in the practice piece as the total number of notes of the practice piece. CPU 11 subtracts 1 from the total number of notes of the practice piece, each time when played in scale error and/or when played an additional note or a missing note, and calculates the final number of notes, that is, the number of notes played correctly, thereby obtaining the achievement level. The specific achievement level and the calculating the achievement level will be arbitrary, and a ratio (percentage) of the number of notes played correctly to the total number of notes of the practice piece can be used as the achievement level.

Then, CPU 11 obtains the present time as the present performance time. Further, CPU 11 stores in the auxiliary storing device 14 the data obtained in the performance data judgment process as new performance data, together with the user's ID indicating the present user and the practice piece ID indicating the present practice piece (step S22). The above obtained data includes the number of the performance starting measure, the number of the performance finishing measure, the performance part and the achievement level, obtained in the performance data judgment process.

Finishing the performance data judgment thread process at step S15 in FIG. 3, CPU 11 returns to step S2 and performs the above processes again.

Figure 5:
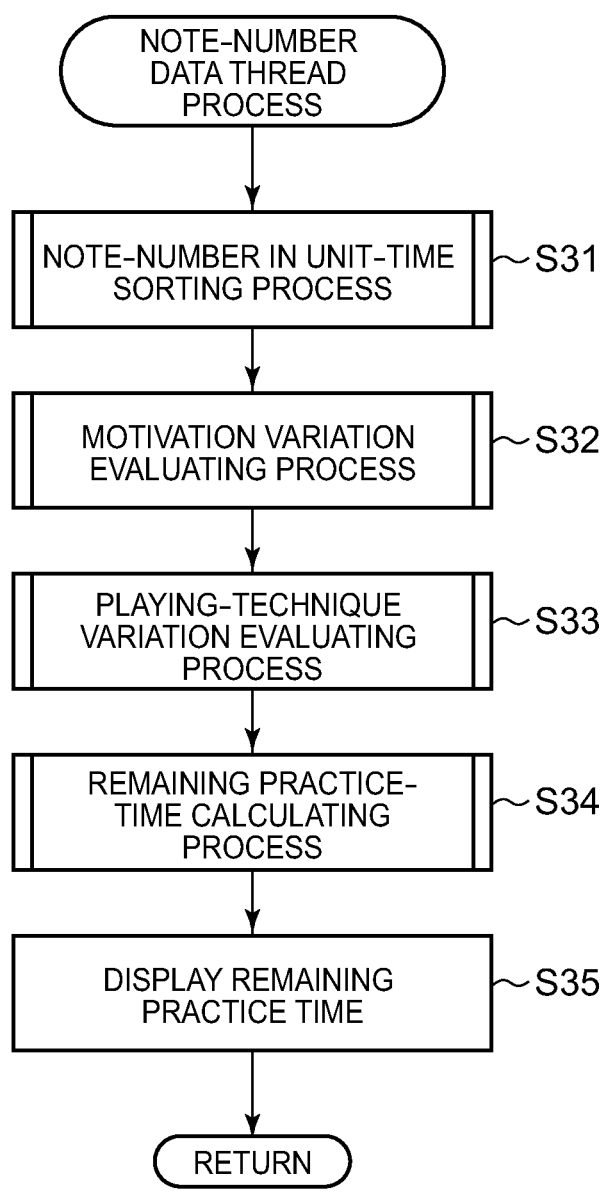
FIG. 5 is a flow chart of a note-number data thread process performed in the musical-instrument practicing apparatus.

Now, the note-number data thread process (step S10 in FIG. 3) will be described in detail. This process is performed by CPU 11 every 2 minutes in the series of processes shown in FIG. 3. As described above, the note-number data thread process is performed to store new note-number data as the note-number history data 201 in the auxiliary storing device 14. FIG. 5 is a flow chart of the note-number data thread process performed by CPU 11.

As shown in FIG. 5, in the note-number data thread process CPU 11 performs following processes in sequence: a note-number in the unit-time sorting process (step S31); a motivation variation evaluating process (step S32); a playing-technique variation evaluating process (step S33); and a remaining practice-time calculating process (step S34), and then CPU 11 displays the remaining practice time on the displaying unit 16 (step S35).

The note-number sorting process (step S31), motivation variation evaluating process (step S32), playing-technique variation evaluating process (step S33) and the remaining practice-time calculating process (step S34) will be described with reference to flow charts of FIG. 6 to FIG. 11. The note-number sorting process (step S31) will be specifically described in accordance with the flow chart of FIG. 6.

The note-number sorting process is performed to determine, to which of the six sorts of playing forms, the content of the user's key operation performed in the unit time, that is, the user's practice state corresponds: a single-hand part practice; a both-hands part practice; a single-hand/both-hands mixed part practice; a single-hand whole practice, a both-hands whole practice; and a single-hand/both-hands mixed whole practice; and to store in the auxiliary storing device 14 new note-number data as the note-number history data 201.

Figure 6:
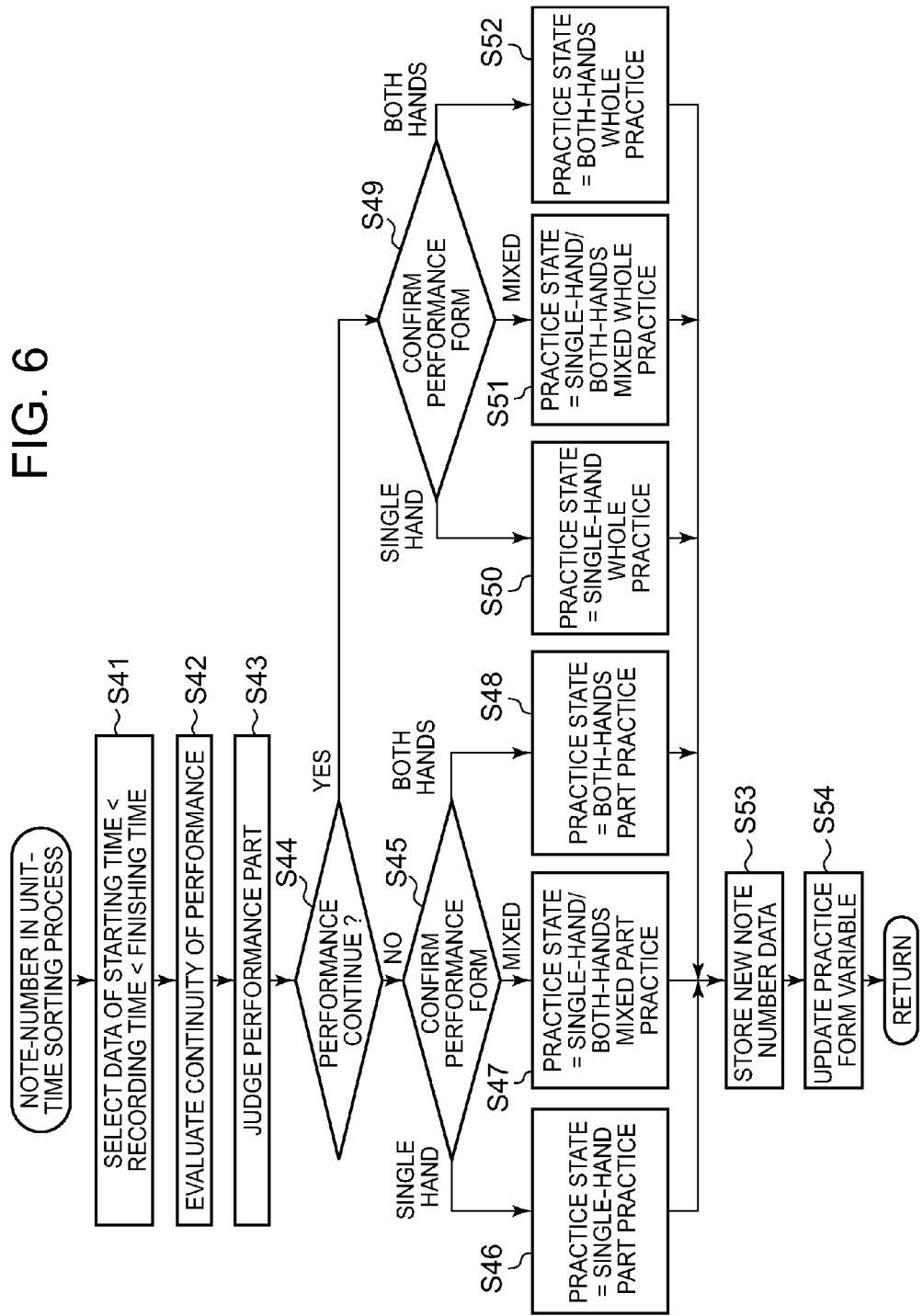
FIG. 6 is a flow chart of a note-number sorting process performed in the musical-instrument practicing apparatus.

As shown in FIG. 6, in the note-number sorting process, CPU 11 selects data of the starting time<recording time<finishing time from among the performance data (step S41). More specifically, CPU 11 selects plural pieces of performance data which fall into a range between the time of starting counting the number of notes (the starting time of counting the number of notes) and the time of finishing counting the number of notes (the finishing time of counting the number of notes), from among plural pieces of performance data stored as the performance history data 101. The time of starting counting the number of notes has been stored in the register at step S2 in FIG. 3 and also the time of finishing counting the number of notes has been stored in the register at step S8 in FIG. 3.

CPU 11 evaluates continuity of the performance performed once or plural times within the unit time (step S42). More specifically, with respect to the plural pieces of performance data selected at step S41, CPU 11 reads in sequence all the measure numbers from the number of the performance starting measure to the number of the performance finishing measure written in each piece of performance data of the practice piece onto a predetermined area of RAM 13. For example, when the number of the performance starting measure written in the first performance data is "1" and the number of the performance finishing measure written in the first performance data is "4", the measure numbers "1, 2, 3, and 4" are read in sequence.

Then, CPU 11 places the read measure numbers on the predetermined area of RAM 13 in ascending order to obtain a value for evaluating the continuity of the measure numbers. The continuity of the measure numbers is concept for judging whether the present performance part is a part of the practice piece or the whole of the practice piece.

More particularly, for instance when read measure numbers are "1, 2, 3, 4, 1, 2, 3, 4, 1, 2, 3, 4", that is, when the first to forth measures have been played three times in the unit time, the measure numbers arranged in ascending order will be as follows: "1, 1, 1, 2, 2, 2, 3, 3, 3, 4, 4, 4". In this arrangement, when the measure number ascends from "1" to "2", a value +1 is counted, when the measure number ascends from "2" to "3", a value +1 is counted, and similarly when the measure number ascends from "3" to "4", a value +1 is counted. Then, the final count value 3 can represent the continuity. CPU 11 obtains this kind of value for evaluating the continuity of the measures.

Further, CPU 11 judges the performance part with respect to every performance performed once or plural times in the unit time (step S43). More specifically, with respect to the plural pieces of performance data selected at step S41, CPU 11 reads values, each indicating the playing form written as performance part in the performance data in sequence onto a predetermined area of RAM 13.

For instance, when the user practices the single-hand part three times in the unit times, values "1, 1, 1" are successively read onto RAM 13. When the user practices the single-hand part once and the both-hands part once in the unit time, values "1, 2" will be successively read onto RAM 13. When the user practices the single-hand/both-hands mixed part three times in the unit time, values "3, 3, 3" are successively read onto RAM 13.

When all the values read onto RAM 13 are "1", CPU 11 determines that the performance part played in the unit time is the single-hand part. When all the values read onto RAM 13 are "2", CPU 11 determines that the performance part played in the unit time is the both-hands part. When the value read onto RAM 13 includes "3" or includes both "1" and "2", CPU 11 determines that the performance part played in the unit time is the single-hand/both-hands mixed part.

CPU 11 judges based on the value obtained at step S42 for evaluating the continuity of the measure numbers, whether the performance continues in the unit time (step S44). More specifically, when the value obtained at step S42 is a predetermined threshold value or larger, CPU 11 determines that the performance continues, wherein, for example, the threshold value corresponds to 80% of the maximum number of measures of the practice piece or 80% of the maximum number of measures of music, and when the value obtained at step S42 is less than the predetermined threshold value, CPU 11 determines that the performance does not continue.

When it is determined that the performance does not continue (NO at step S44), CPU 11 confirms the performance part judged in the process at step S43 (step S45), and determines which practice state of the performance is performed in the unit time. When the performance part is the single-hand part, CPU 11 determines that the practice state is the single-hand part practice (step S46). When the performance part is the single-hand/both-hands mixed part, CPU 11 determines that the practice state is the single-hand/both-hands mixed part practice (step S47), and when the performance part is the both-hands part, CPU 11 determines that the practice state is the both-hands part practice (step S48).

When it is determined that the performance continues (YES at step S44), CPU 11 confirms the performance part judged in the process at step S43 (step S49), and determines which practice state of the performance is performed in the unit time. When the performance part is the single-hand part, CPU 11 determines that the practice state is the single-hand whole practice (step S50). When the performance part is the single-hand/both-hands mixed part, CPU 11 determines that the practice state is the single-hand/both-hands mixed whole practice (step S51), and when the performance part is the both-hands part, CPU 11 determines that the practice state is the both-hands whole practice (step S52).

CPU 11 stores new note-number data as the note-number history data 201 in the auxiliary storing device 14 (step S53). In other words, CPU 11 stores note-number data including the user's ID indicating the present user, the practice piece ID indicating the present practice piece, the number of notes in the unit time, the practice state, and the recording time. The number of notes in the unit time corresponds to the number of notes, which was copied onto the predetermined area of RAM 13 at step S9 in FIG. 3. The practice state is a practice state variable, which is determined in either one of processes at step S46 to step S48 and at step S50 to step S52. The recording time is the present time.

Further, CPU 11 updates the practice state variable (step S54). More specifically, CPU 11 replaces the practice state variable stored in the predetermined area of RAM 13 to be used in the previous note-number sorting process with the practice state variable determined in the present note-number storing process, finishing the note-number sorting process.

Figure 7:
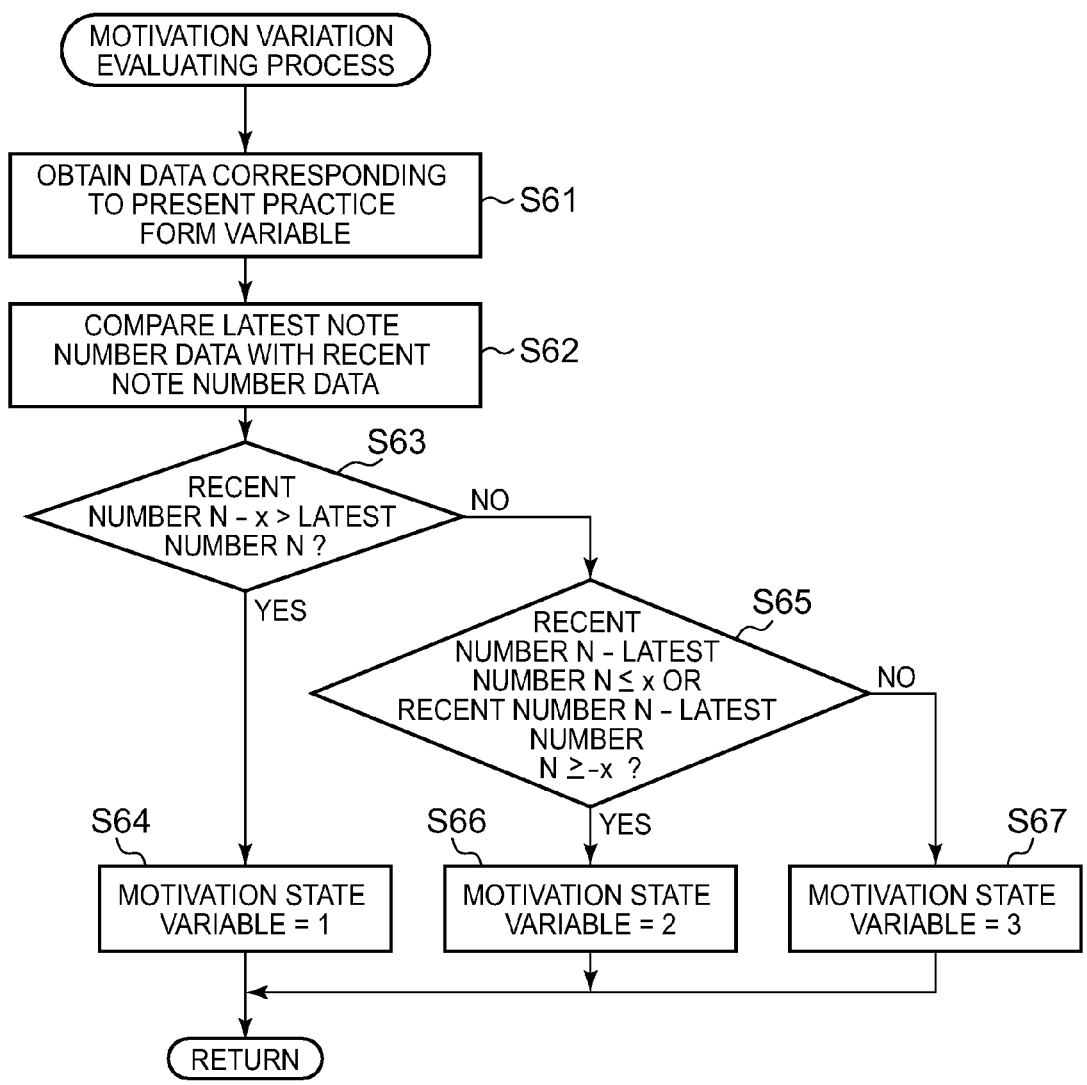
FIG. 7 is a flow chart of the motivation variation evaluating process performed in the musical-instrument practicing apparatus.

Hereinafter, the motivation variation evaluating process (step S32 in FIG. 5) will be described in detail. FIG. 7 is a flow chart of the motivation variation evaluating process performed in the musical-instrument practicing apparatus 1.

The motivation variation evaluating process is performed to obtain a motivation state variable, which represents a variation trend of the number of notes in the latest unit time and also represents an evaluation degree given when a degree of the present motivation of the user is evaluated at three steps.

In the motivation variation evaluating process shown in FIG. 7, CPU 11 extracts the recent data corresponding to the present practice state variable from the note-number data (step S61). More specifically, CPU 11 searches for the note-number data, in which the same practice state variable as the present practice state variable updated in the process at step S54 in FIG. 6 is written, through the note-number history data 201, and then reads the recent note-number data stored before the latest note-number data, from among the found note-number data.

CPU 11 compares the latest note-number data with the recent note-number data read in the process at step S61 (step S62).

When the number (the latest N) of notes in the unit time, written in the latest note-number data is smaller than the number (the recent N) of notes in the unit time, written in the recent note-number data by a predetermined number "x" (for instance, "5") or more (YES at step S63), CPU 11 determines that the motivation state is "decreased" and sets the motivation state variable to "1" (step S64).

When a difference between the number (the latest N) of notes in the unit time, written in the latest note-number data and the number (the recent N) of notes in the unit time, written in the recent note-number data is the predetermined number "x" or less, and the both numbers of notes are substantially the same (NO at step S63 and YES at step S65), CPU 11 determines that the motivation state is "not changed" and sets the motivation state variable to "2" (step S66).

In the case other than the above cases, that is, when the number (the latest N) of notes in the unit time, written in the latest note-number data is larger than the number (the recent N) of notes in the unit time, written in the recent note-number data by larger than the predetermined number "x" (NO at step S65), CPU 11 determines that the motivation state is "increased" and sets the motivation state variable to "3" (step S67).

Figure 8:
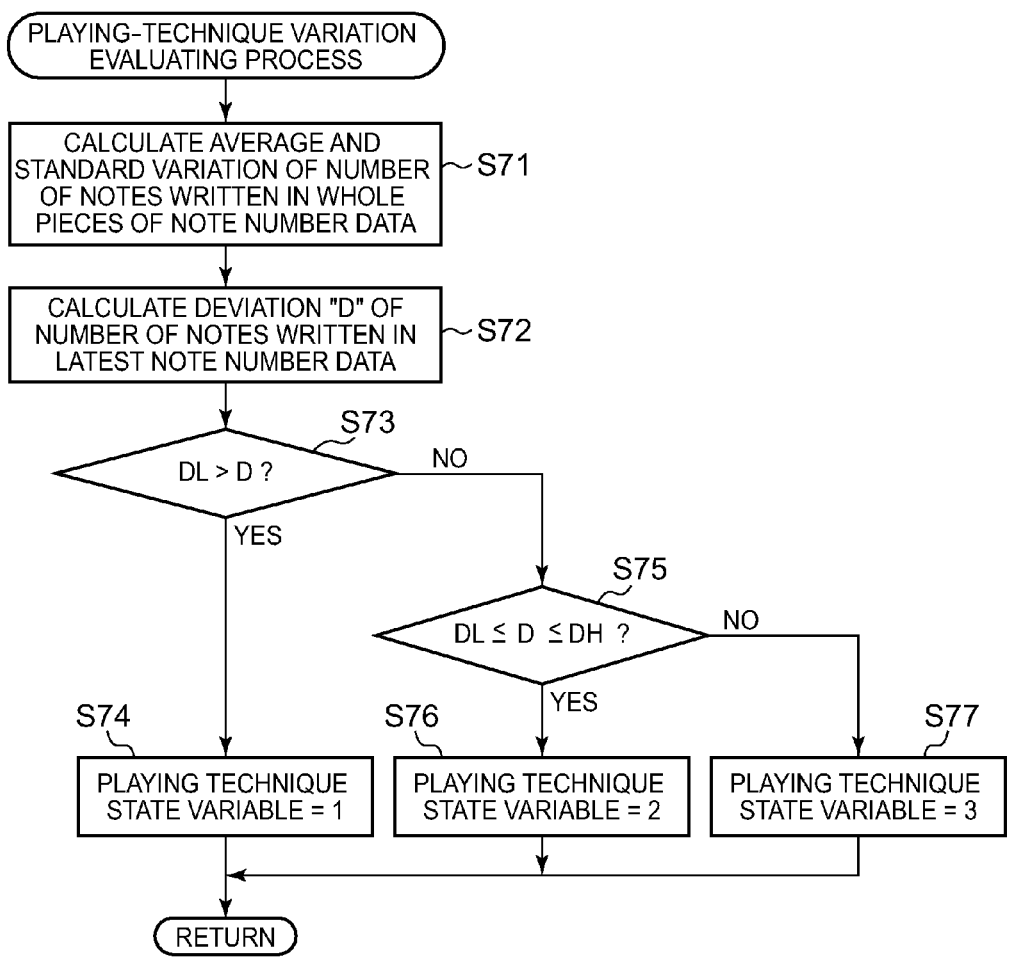
FIG. 8 is a flow chart of a playing-technique variation evaluating process performed in the musical-instrument practicing apparatus.

Next, the playing-technique variation evaluating process (step S33 in FIG. 5) will be described in detail. FIG. 8 is a flow chart of the playing-technique variation evaluating process performed in the musical-instrument practicing apparatus 1.

The playing-technique variation evaluating process is performed to obtain a playing technique state variable, which represents a variation trend of the number of notes in the latest unit time and further represents an evaluation degree given when the progressing rate of the latest playing technique of the user is compared with the previous rate and evaluated at three steps.

In the playing-technique variation evaluating process shown in FIG. 8, CPU 11 searches for the note-number data, in which the same practice state variable as the present practice state variable updated in the process at step S54 in FIG. 6 is written, through the note-number history data 201, and then calculates the average and standard deviation of the number of notes written in the whole pieces of the found note-number data (step S71).

Using the average and the standard deviation of the number of notes calculated at step S71, CPU 11 calculates the deviation "D" of the number of notes written in the latest note-number data (step S72). In other words, CPU 11 calculates a degree of bias of the latest number of notes relatively to the number of notes stored in past in the note-number history data 201.

When the calculated deviation "D" is smaller than the lower limit value "DL" of a range having a deviation as a standard at the center (YES at step S73), CPU 11 determines that the progressing rate of playing technique decreases relatively, and sets "1" to the playing technique state variable (step S74). The above mentioned deviation as the standard is, for instance, the deviation of the average of the number of notes.

When the calculated deviation "D" falls within the above mentioned range (NO at step S73, YES at step S75), CPU 11 determines that the progressing rate of playing technique does not change relatively and keeps normal, and then sets "2" to the playing technique state variable (step S76).

In the case other than the above cases, that is, when the calculated deviation "D" is larger than the upper limit value "DH" of the range (NO at step S75), CPU 11 determines that the progressing rate of playing technique increases relatively, and sets "3" to the playing technique state variable (step S77).

Then, the remaining practice-time calculating process (step S34 in FIG. 5) will be described in particular with reference to a flow chart of FIG. 9.

The remaining practice-time calculating process is performed to calculate a practice time (remaining practice time) that the user requires to improve his/her playing technique to reach such a level at which he/she can play the practice piece naturally and fluently.

Figure 9:
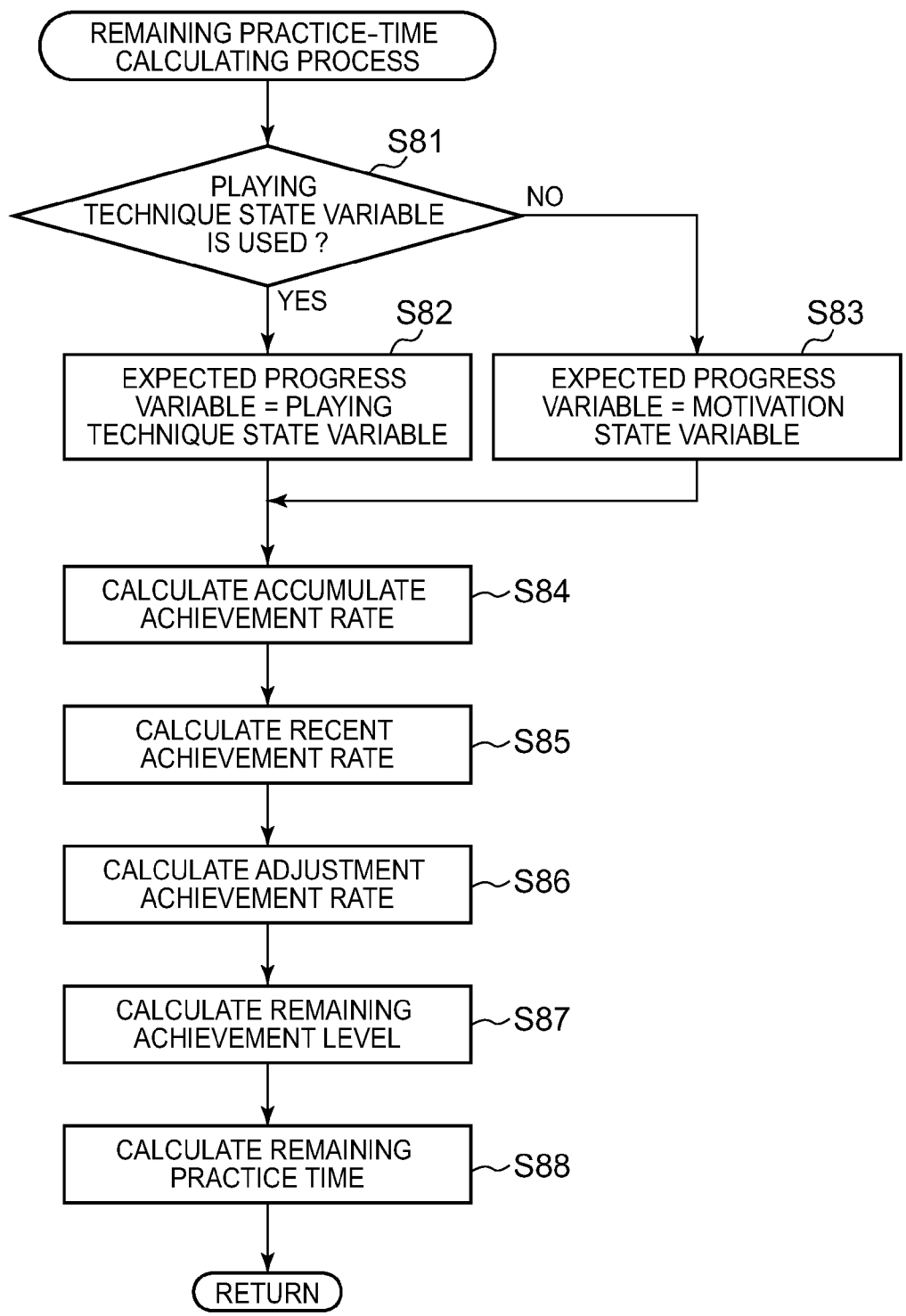
FIG. 9 is a flow chart of a remaining practice-time calculating process performed in the musical-instrument practicing apparatus.

In the remaining practice-time calculating process shown in FIG. 9, CPU 11 confirms the sort of the index to be used to indicate the expected progress of the playing technique. When the index is the playing technique state variable (YES at step S81), CPU 11 sets the playing technique state variable as an expected progress variable (step S82). When the index is the motivation state variable (NO at step S81), then CPU 11 sets the motivation state variable as the expected progress variable (step S83).

Then, CPU 11 calculates an accumulated achievement rate representing a variation of the progressing level of the playing technique enhanced in a long term (step S84). More specifically, CPU 11 calculates the accumulated achievement rate from the following formula (1) on the assumption that the progressing level of the playing technique is improved in proportion to the practice time (varies linearly).

$$\text{Accumulated achievement rate} = \text{Accumulated achievement level} / \text{Accumulated practice time} \quad (1)$$

In the above formula (1), the accumulated achievement level is obtained by subtracting the achievement level written in the oldest performance data from the achievement level written in the latest performance data stored as the performance history data 101. The accumulated practice time is the accumulated practice time, which was stored in the auxiliary storing device 14 in the process at step S15 in FIG. 3 at the time when the user performed and finished the last performance with use of the support function of the electronic musical instrument 21.

Then, CPU 11 calculates a recent achievement rate representing a variation of the progressing level of the playing technique enhanced in a short term (step S85). More specifically, CPU 11 calculates the recent achievement level from the following formula (2) on the assumption that the recent achievement rate and the progressing level of the playing technique vary in proportion to the practice time.

$$\text{Recent achievement rate} = (\text{Latest achievement level in the unit time} - \text{Oldest achievement level in the unit time}) / \text{the unit time} \quad (2)$$

In the formula (2), the latest achievement level in the unit time is the accumulated achievement level used in formula (1), and the oldest achievement level in the unit time is the achievement level written in the performance data whose recording time is after the time of stating counting the number of notes stored in the register at step S2 in FIG. 3 and having the oldest recording time, among the plural pieces of performance data stored as the performance history data 101.

Figure 10:
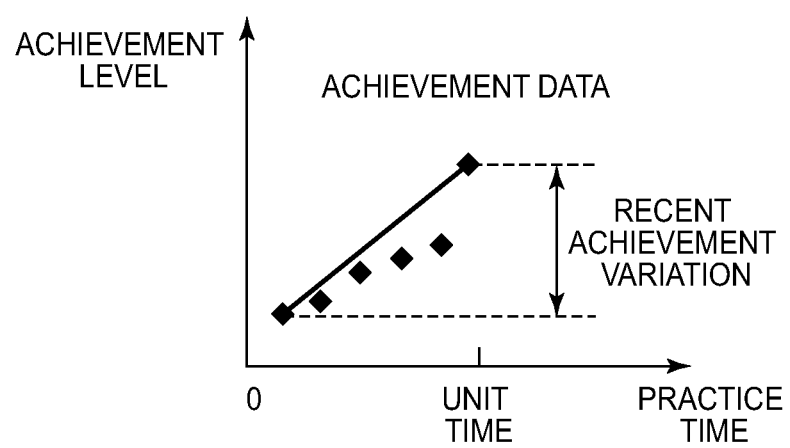
FIG. 10 is a view showing a relationship between achievement levels and recent achievement rates, written respectively in the plural pieces of performance data in the unit time.

FIG. 10 is a view showing a relationship between the achievement levels and the recent achievement rates, written respectively in the plural pieces of performance data recorded in the unit time. The slope of the straight line shown in FIG. 10 corresponds to the recent achievement rate.

Then, CPU 11 calculates the adjustment achievement rate (step S86). More specifically, CPU 11 calculates the adjustment achievement rate, using a formula decided depending on which one is larger, the accumulated achievement rate or the recent achievement rate.

In other words, in the case where (Recent achievement rate−Accumulated achievement rate)≥0 is true, CPU 11 uses the following formula (3) to calculate the adjustment achievement rate.

$$\text{Adjustment achievement rate} = (\text{Recent achievement rate} - \text{Accumulated achievement rate}) \div (\text{the number of states of the expected progress variables} - 1) \times (\text{Expected progress variable} - 1) + \text{Accumulated achievement rate} \quad (3)$$

In the case where (Recent achievement rate−Accumulated achievement rate)<0 is true, CPU 11 uses the following formula (4) to calculate the adjustment achievement rate.

Adjustment achievement rate=(Recent achievement rate−Accumulated achievement rate)÷(the number of states of the expected progress variables−

1)×(the number of states of the expected progress variables−Expected progress variable)+Accumulated achievement rate     (4)

In the above formulas (4), the number of states of the expected progress variables corresponds to the number of evaluation stages given when the level of the present motivation of the user is evaluated in obtaining the motivation state variable or the number of evaluation stages given when evaluating how much the latest progressing rate of the playing technique has been increased or decreased relatively in obtaining the playing technique state variable. In the present embodiment, the number of evaluation states of the expected progress variables is 3.

In other words, in the process at step S86, the following adjustment rate will be obtained as a result of the calculation.

In the case where the recent achievement rate is faster than the accumulated achievement rate, when the expected progress variable is "1", the same adjustment achievement rate as the accumulated achievement rate will be obtained. When the expected progress variable is "3", the same adjustment achievement rate as the recent achievement rate will be obtained, and when the expected progress variable is "2", the adjustment achievement rate falling just between the recent achievement rate and the accumulated achievement rate will be obtained.

The above will be described in further detail. With reference to FIG. 11, in the case where the recent achievement rate is faster than the accumulated achievement rate, a time when the achievement level will reach the target level, as predicted from the calculated adjustment achievement rate, will be determined as follows: when the expected progress variable is "1", such time will be given by the black point corresponding to the practice time "C"; when the expected progress variable is "3", such time will be given by the black point corresponding to the practice time "A"; and when the expected progress variable is "2", such time will be given by the white point corresponding to the practice time "B".

On the contrary, in the case where the recent achievement rate is slower than the accumulated achievement rate, the same adjustment achievement rate as the recent achievement rate will be obtained, when the expected progress variable is "1"; the same adjustment achievement rate as the accumulated achievement rate will be obtained, when the expected progress variable is "3"; and the adjustment achievement rate falling just between the recent achievement rate and the accumulated achievement rate will be obtained, when the expected progress variable is "2".

The above will be described with reference to FIG. 11 in further detail. In the case where the recent achievement rate is slower than the accumulated achievement rate, the time when the achievement level will reach the target level as predicted from the adjustment achievement rate will be determined as follows: when the expected progress variable is "1", such time will be given by the black point corresponding to the practice time "E"; when the expected progress variable is "3", such time will be given by the black point corresponding to the practice time "C"; and when the expected progress variable is "2", such time will be given by the white point corresponding to the practice time "D".

After calculating the adjustment achievement rate in the process at step S86, CPU 11 calculates a remaining achievement level (step S87). In other words, CPU 11 uses the following formula (5) to calculate the remaining achievement level.

Remaining achievement level=Target achievement level−Present achievement level     (5)

In the above formula (5), the target achievement level of playing technique is the achievement level, at which the user feels as being able to play the practice piece naturally and fluently. The present achievement level is the achievement level reached by the user in the unit time, and corresponds to the accumulated achievement level.

Then, CPU 11 calculates the remaining practice time based on the adjustment achievement rate calculated at step S86 and the remaining achievement level calculated at step S87 (step S88). In other words, CPU 11 uses the following formula (6) to calculate the remaining practice time.

Remaining practice time=Remaining achievement level/Adjustment achievement rate     (6)

The remaining practice time calculated in the process at step S88 is displayed on the displaying unit 16 in the process at step S35 in the note-number data thread process shown in FIG. 5.

As described above, in the musical-instrument practicing apparatus 1 according to the present embodiment of the invention, the remaining practice time is calculated based on the performance history data 101 shown in FIG. 2A and the note-number history data 201 shown in FIG. 2B. Therefore, unlike the conventional apparatuses, which calculate the remaining practice time based only on the history of the user's progressing level of playing technique, the present musical-instrument practicing apparatus 1 can calculate the more precise remaining practice time, in other words, the present musical-instrument practicing apparatus 1 can predict more precisely the practice time, which the user needs to improve his/her playing technique to reach the target level at playing technique.

In the present embodiment of the invention, the remaining practice time is calculated based on the accumulated achievement level and the recent achievement level, in consideration of the progress of the playing technique expected based on the latest number of notes in the note-number history in every unit time stored as the note-number history data 201. Therefore, when the user practices reasonably, the practice time, which the user needs to improve his/her playing technique to reach the target level at playing technique can be calculated more precisely.

In the present embodiment of the invention, CPU 11 obtains two sorts of variables such as the motivation state variable and the playing technique state variable as the expected progress variable or the index indicating the expected progress of the playing technique. Further, CPU 11 selectively uses these two sorts of variables to calculate the remaining practice time.

When the motivation state variable is used as the expected progress variable, the remaining practice time, which is directly reflected by the present motivation of the user and meets readiness can be obtained.

When the playing technique state variable is used as the expected progress variable, even though remaining practice times are calculated every unit time, the calculated practice times have a little variation and the remaining practice time meeting stability can be obtained.

In the present embodiment of the invention, when the motivation state variable and the playing technique state variable are obtained to be used as the expected achievement variable, only the note-number data generated when a performance is given in the same playing form as the present playing form is used, among a series of note-number data stored as the note-number history data 201. Therefore, the practice time, which the user needs to improve his/her playing technique to reach the target level at playing technique can be calculated more precisely.

Modifications to the present embodiment of the invention will be described. In the present embodiment of the invention, when the motivation state variable is decided in the motivation variation evaluating process shown in FIG. 7, the latest note-number data and the recent note-number data stored before the latest note-number data among plural pieces of note-number data, in which the same practice state variable as the present practice state variable is written are compared, and the motivation state variable is decided based on the result of the comparison of the number of notes written in the both note-number data. But the above process can be performed using the average of the number of notes written in plural pieces (for example, 10) of recent note-number data in place of the number of notes written in the recent note-number data.

The process shown in FIG. 9 can be modified as follows. That is, there is a case where new performance data is not stored as the performance history data 101 for more than a predetermined time duration while the user is actually performing the practice. In this case, the recent achievement rate calculated in the process at step S85 will change greatly, and as a result, the remaining practice times calculated during the practice also will change greatly.

For example, the process at step S85 can be modified as follows. The recent achievement rate calculated in the process at step S85 is stored in the predetermined area of RAM 13 and is to be updated. And, when a new recent achievement rate is calculated, CPU 11 judges whether performance data was written in the performance history data 101 in the recent predetermined time (for example, in past 3 minutes). When it is determined that such performance data was stored in the performance history data 101, the recent achievement rate is calculated in the same manner as in the present embodiment. When such performance data was not stored in the performance history data 101, the recent achievement rate stored in the predetermined area of RAM 13 is obtained as the present recent achievement rate, and used in the process at step S86 and thereafter.

This process will previously prevent the remaining practice times to be calculated from changing greatly when the new performance data is not stored during the predetermined period of time.

In the present embodiment of the invention, the case has been described, where the number of states indicated by the expected achievement variables, that is, the number of stages of the motivation states or playing technique states is "3". But, when the apparatus according to the present invention is used in practice, the number of states (number of stages) indicated by the expected achievement variables can be arbitrary, and the more the number of states, the more precisely the practice time can be calculated.

FIG. 12 is a view corresponding to FIG. 11 and showing, for convenience, a relationship between the achievement levels of the playing technique and the practice times in the case of the number of states "5". Similarly to FIG. 11, the times indicated by the black points and the white points in FIG. 12 represent expected times, at which the achievement level of the playing technique will reach the target level. These times correspond to the expected achievement variables, respectively, and are calculated based on the adjustment achievement rates calculated in the remaining practice time calculating process shown in FIG. 9. The practice times corresponding respectively to the times indicated by the black points and the white points are A, B−n, B, B+n, C, D−m, D, D+m, and E. Intervals between the practice times indicated by A, B−n, B, B+n and C are even, and intervals between the practice times indicated by D−m, D, D+m and E are also even.

In the present embodiment of the invention, the case has been described, where the user is allowed to previously select one of the motivation state variable and the playing technique state variable to use as the expected progress variable. But it is possible to previously set variables to be used as the expected achievement variables or to set such variables automatically by an arbitrary method at the time when the remaining practice time is calculated.

When the remaining practice time is calculated, it is possible to calculate the remaining practice time, using the motivation state variable as the expected achievement variable and also possible to calculate the remaining practice time, using the playing technique state variable as the expected achievement variable, and further possible to display these separately calculated remaining practice times on the displaying unit 16 in a distinguishable manner. In this case, it is also possible to display both remaining practice times simultaneously on the displaying unit 16, or to alternatively display the remaining practice times on the display unit 16 in response to a predetermined button operation executed by the user.

In the description of the present embodiment of the invention, the musical-instrument practicing apparatus 1 has been described, which is provided with the function of a practice-time calculating apparatus according to the present invention and is constructed separately from the electronic musical instrument 21. But when the invention is performed in practice, it is possible to provide the function of a practice-time calculating apparatus onto the electronic musical instrument 21. Further, in the description of the present embodiment of the invention, the user uses the support function, which makes LEDs successively turn on to indicate keys to be played, when the user plays the practice piece. But even if the user plays the practice piece without using the support function, the present invention can be used. For instance, if the user plays a practice piece in such manner that said practice piece can be specified by an arbitrary method, the function of the invention for calculating the practice time can be used.

Although specific embodiments of the invention and modifications thereto have been described in the foregoing detailed description, it will be understood that the invention is not limited to the particular embodiments and modifications described herein, but modifications and/or rearrangements may be made to the disclosed embodiments and modifications while remaining within the scope of the invention as defined by the following claims. It is intended to include all such modifications and rearrangements in the following claims and their equivalents.

What is claimed is:

1. A practice-time calculating apparatus comprising:
   a memory; and
   a processor, wherein the processor is configured to:
   evaluate a progressing level of a playing technique of a user who operates a playable unit;
   record a history of the evaluated progressing level to the memory;
   count a number of operations executed on the playable unit by the user in a unit time;
   record a history of the number of operations counted to the memory;
   calculate a practicetime, which is required for the user to improve the playing technique to reach a predetermined progressing level at the playing technique, based on the history of the progressing level recorded in the memory; and adjust the calculated practice time based on the history of the number of operations recorded in the memory, wherein the adjusted calculated practice time is an amount of future practice time required for the user to practice in order to reach the predetermined progressing level at the playing technique.

2. The practice-time calculating apparatus according to claim 1, wherein the processor is further configured to:

calculate, based on the history of the progressing level recorded in the memory, a long-term variation rate indicating a variation of the progressing level of the playing technique in a relatively long term rather than a short-term variation rate;

calculate, based on the history of the progressing level recorded in the memory, a short-term variation rate indicating a variation of the progressing level of the playing technique in a relatively short term rather than the long-term variation rate;

obtain variation-trend information indicating a recent variation trend of the number of operations in the history of the number of operations recorded in the memory; and obtain a time interval, which (i) is defined by a time calculated based on the long-term variation rate and a time calculated based on the short-term variation rate and (ii) is adjusted based on the variation trend indicated by the obtained variation-trend information, thereby using the obtained time interval as the practice time that is required to the user to improve the playing technique to reach the predetermined progressing level at the playing technique.

3. The practice-time calculating apparatus according to claim 2, wherein the processor is configured to the variation-trend information with respect to the history of the number of operations executed on the playable unit in a predetermined recent period, recorded in the memory.

4. The practice-time calculating apparatus according to claim 3, wherein the processor is configured to obtain the variation-trend information, which represents a latest relative variation of the number of operations executed in a predetermined recent period, in the history of the number of operations recorded in the memory.

5. The practice-time calculating apparatus according to claim 2, wherein the processor is configured to obtain the variation-trend information with respect to the history of the number of operations executed on the playable unit in a whole period, recorded in the memory.

6. The practice-time calculating apparatus according to claim 5, wherein the processor configured to obtain the variation-trend information, which represents a degree of bias of the number of operations executed in a latest period in the history of the number of operations in the whole period, recorded in the memory.

7. The practice-time calculating apparatus according to claim 1, wherein the processor further configured to:

discriminate a playing form executed by the user in the unit time; and record, to the memory, the history of the number of operations counted together with the discriminated playing form, and adjust the calculated practice time, based on the history of the number of operations belonging to a same group as that to which the playing form belongs, in the history of the number of operations recorded in the memory.

8. The practice-time calculating apparatus according to claim 2, wherein the processor is further configured to:

discriminate a playing form executed by the user in the unit time; and record, to the memory, the history of the number of operations counted together with the discriminated playing form, and adjust the calculated practice time, based on the history of the number of operations belonging to a same group as that to which the playing form belongs, in the history of the number of operations recorded in the memory.

9. The practice-time calculating apparatus according to claim 3, wherein the processor is further configured to:

discriminate a playing form executed by the user in the unit time; and record, to the memory, the history of the number of operations counted together with the discriminated playing form, and adjust the calculated practice time, based on the history of the number of operations belonging to a same group as that to which the playing form belongs, in the history of the number of operations recorded in the memory.

10. The practice-time calculating apparatus according to claim 4, wherein the processor is further configured to:

discriminate a playing form executed by the user in the unit time; and record, to the memory, the history of the number of operations counted together with the discriminated playing form, and adjust the calculated practice time, based on the history of the number of operations belonging to a same group as that to which the playing form belongs, in the history of the number of operations recorded in the memory.

11. The practice-time calculating apparatus according to claim 5, wherein the processor is further configured to:

discriminate a playing form executed by the user in the unit time; and record, to the memory, the history of the number of operations counted together with the discriminated playing form, and adjust the calculated practice time, based on the history of the number of operations belonging to a same group as that to which the playing form belongs, in the history of the number of operations recorded in the memory.

12. The practice-time calculating apparatus according to claim 6, wherein the processor is further configured to:

discriminate a playing form executed by the user in the unit time; and record, to the memory, the history of the number of operations counted with the discriminated playing form, and adjust the calculated practice time, based on the history of the number of operations belonging to a same group as that to which the playing form belongs, in the history of the number of operations recorded in the memory.

13. A practice-time calculating method for a practice-time calculating apparatus which includes a memory and a processor, the method comprising:

evaluating, with the processor, a progressing level of a playing technique of a user who operates a playable unit;

recording, with the processor, a history of the evaluated progressing level to the memory;

counting, with the processor, a number of operations executed on the playable unit by the user in a unit time;

recording, with the processor, a history of the counted number of operations to the memory;

calculating, with the processor, a practice time, which is required for the user to improve the playing technique to reach a predetermined progressing level at the playing technique, based on the history of the progressing level recorded in the memory; and adjusting, with the processor, the calculated practice time, based on the history of the number of operations recorded in the memory, wherein the adjusted calculated practice time is an amount of future practice time required for the user to practice in order to reach the predetermined progressing level at the playing technique.

14. A non-transitory computer-readable recording medium having stored thereon a program that is executable by a computer to cause the computer perform functions comprising:

evaluating a progressing level of a playing technique of a user who operates a playable unit;

recording a history of the evaluated progressing level to a memory;

counting a number of operations executed on the playable unit by the user in a unit time;

recording a history of the number of operations counted to the memory;

calculating a practice time, which is required for the user to improve the playing technique to reach a predetermined progressing level at the playing technique, based on the history of the progressing level recorded in the memory; and adjusting the calculated practice time based on the history of the number of operations recorded in the memory, wherein the adjusted calculated practice time is an amount of future practice time required for the user to practice in order to reach the predetermined progressing level at the playing technique.

\* \* \* \* \*

UNITED STATES PATENT AND TRADEMARK OFFICE
CERTIFICATE OF CORRECTION

| | |
|---|---|
| PATENT NO. | : 9,018,503 B2 |
| APPLICATION NO. | : 14/031817 |
| DATED | : April 28, 2015 |
| INVENTOR(S) | : Tanaka |

Page 1 of 1

It is certified that error appears in the above-identified patent and that said Letters Patent is hereby corrected as shown below:

In the claims

Column 18, claim 1, line 12, delete "practicetime" and insert --practice time--.

Column 19, claim 6, line 2, delete "processor" and insert --processor is--.

Column 19, claim 7, line 2, delete "processor" and insert --processor is--.

Signed and Sealed this
Third Day of November, 2015

Michelle K. Lee
*Director of the United States Patent and Trademark Office*